Figure 1:
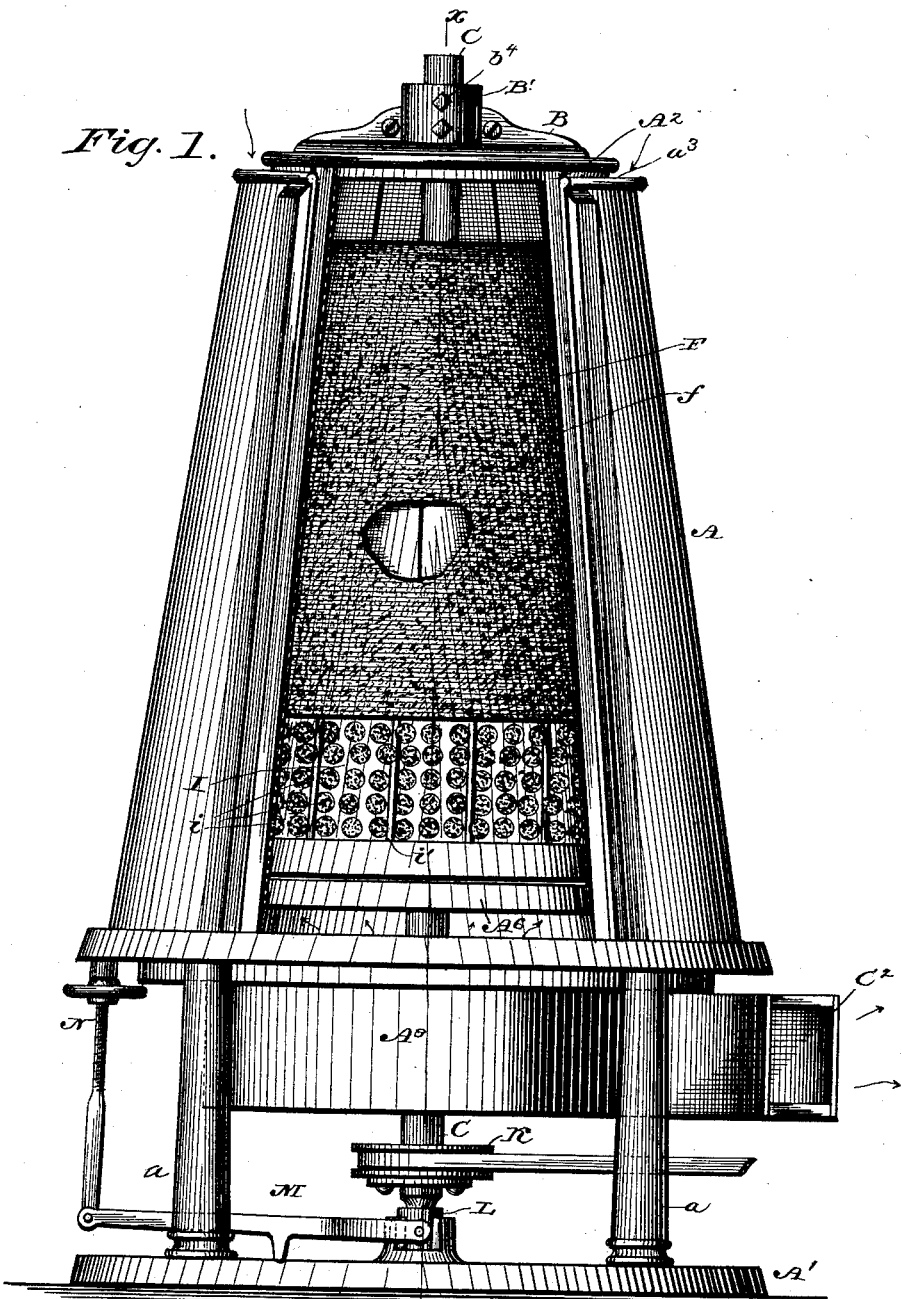

(No Model.) 4 Sheets—Sheet 3.

M. CRAWFORD.
GRAIN CLEANING MACHINE.

No. 348,890. Patented Sept. 7, 1886.

WITNESSES
Phil C Dieterich.
E. F. Williams

INVENTOR
Middleton Crawford
By Collyer & Baird
Attorneys (No Model.) 4 Sheets—Sheet 4.
M. CRAWFORD.
GRAIN CLEANING MACHINE.
No. 348,890. Patented Sept. 7, 1886.
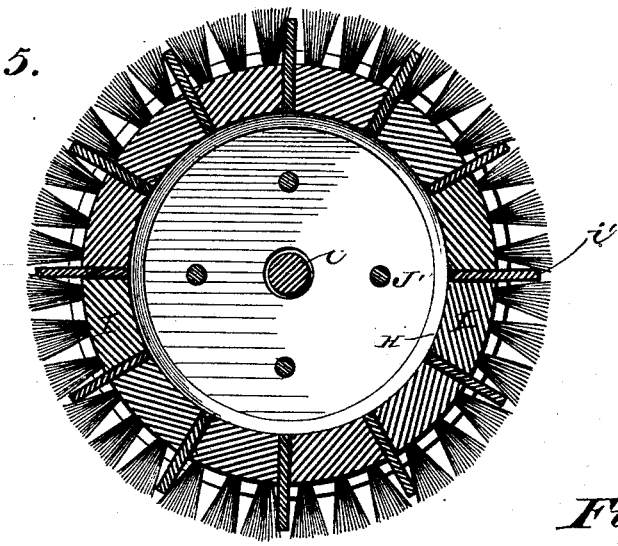
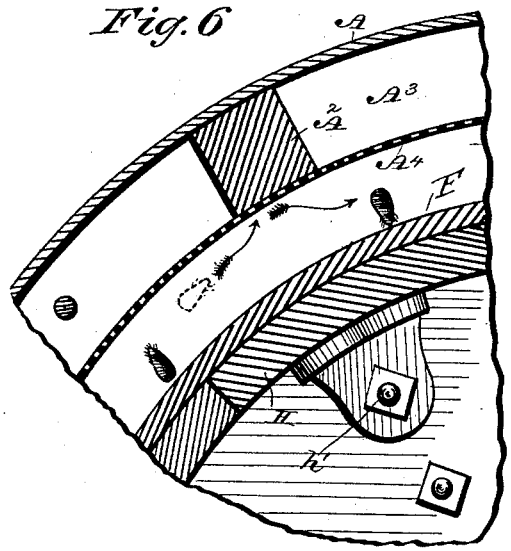
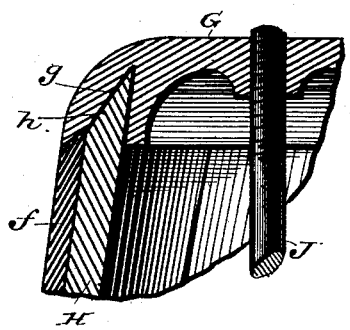
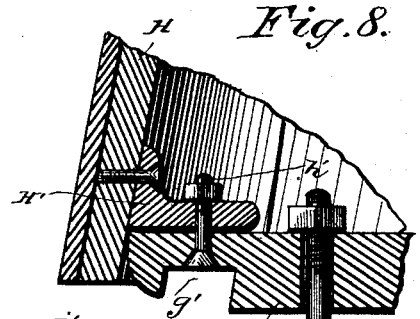
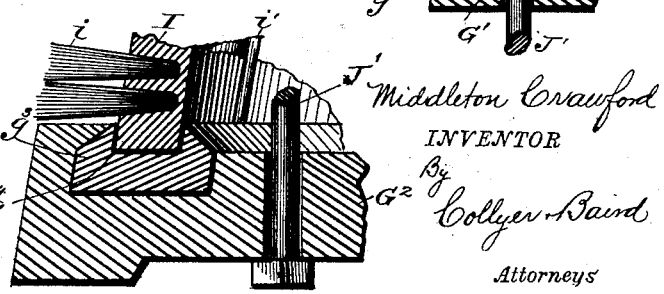
Middleton Crawford
INVENTOR
By Collyer & Baird
Attorneys
WITNESSES
Phil C. Dieterich
E. F. Williams
N. PETERS, Photo-Lithographer, Washington, D. C.

UNITED STATES PATENT OFFICE.

MIDDLETON CRAWFORD, OF BROOKLYN, NEW YORK.

GRAIN-CLEANING MACHINE.

SPECIFICATION forming part of Letters Patent No. 348,890, dated September 7, 1886.

Application filed February 23, 1886. Serial No. 192,800. (No model.)

*To all whom it may concern:*

Be it known that I, MIDDLETON CRAWFORD, a citizen of Canada, residing at Brooklyn, in the county of Kings and State of New York, have invented certain new and useful Improvements in Grain-Cleaning Machines; and I do declare the following to be a full, clear, and exact description of the invention, such as will enable others skilled in the art to which it appertains to make and use the same, reference being had to the accompanying drawings, and to the letters and figures marked thereon, which form part of this specification.

My invention relates to grain-cleaners; and the novelty consists in the construction, arrangement, and adaptation of parts, as will be more fully hereinafter set forth, and specifically pointed out in the claims.

The essential object of the invention is to eliminate the natural "fuzz" or bristle from the berries, and also all the smut and deleterious substances which adhere to the shells or pods of the berries without breaking the pods.

The invention takes into cognizance several facts which I deem to be important, to wit: First, the natural fuzz adhering to the berry will bend without breaking, and is composed largely of silica, which, according to Mohr's scale, has a hardness of seven (7) while emery or corundum has a hardness of nine (9;) second, that beating the berries or stirring them violently in mass, or rubbing them between adjacent surfaces and in contact with each other, while it is liable to rupture the pods or hulls of the berry, will not effectually and completely rid the berries of the fuzz or bristles mentioned; third, that when the hull has been once broken small fragments of it adhere to the surface of the cereal, and in the subsequent separation of these fragments much of the flour is lost—at times about ten parts of flour to one of bran.

Grain has been scoured in several ways and by different means. Arms rigid with revolving cylinders have been forced through it in mass. It has been knocked about between stationary and moving arms or cleats. It has been rubbed between a moving and a stationary surface, and has been allowed to fall between a revolving cone and a casing.

In my invention the grain is evenly distributed by the centrifugal force of a revolving cone having an emery surface, and is passed to an annular space between such cone and a wire-gauze concave of sufficient area to allow the grain to be thrown, end over end, from the cone to the concave and back again. The wire-gauze covers a dust-chamber, which extends over the entire surface of the concave. The grain falls through this annular space, but by reason of the motion of the cone and the friction therewith each berry is carried around about nine times—a distance of, say, fifty-four feet, before reaching the bottom. While held in suspension the cutting-surface of the cone, which revolves rapidly, grinds off the silicious fuzz, and the contact is only frictional. The berries never receive a direct blow. They partake slightly of the cone's motion when they are thrown against the wire-gauze, but not violently enough to crack the hull. Thence they bound back to the cone to be similarly ground upon another surface.

The invention in detail is fully illustrated in the accompanying drawings, which form a part of this specification, and in which—

Figure 2:
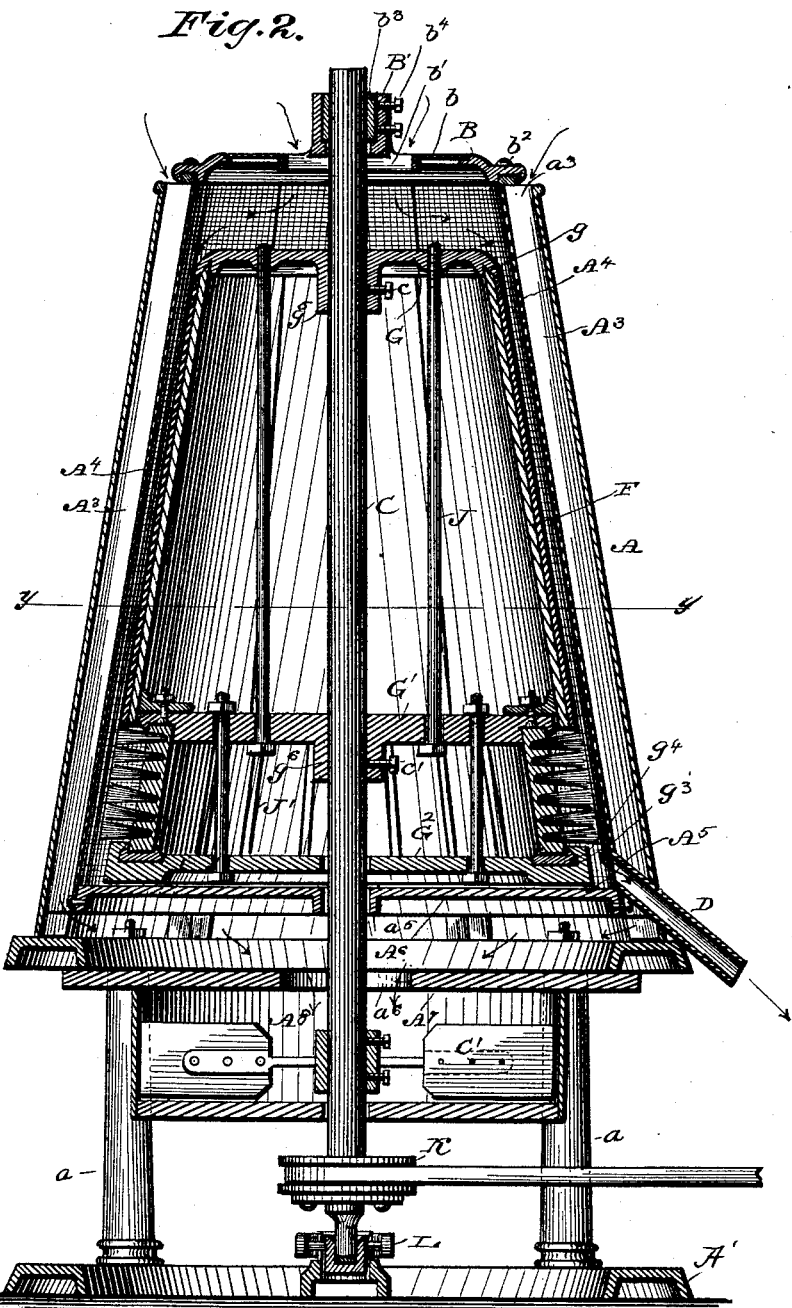
Figure 3:
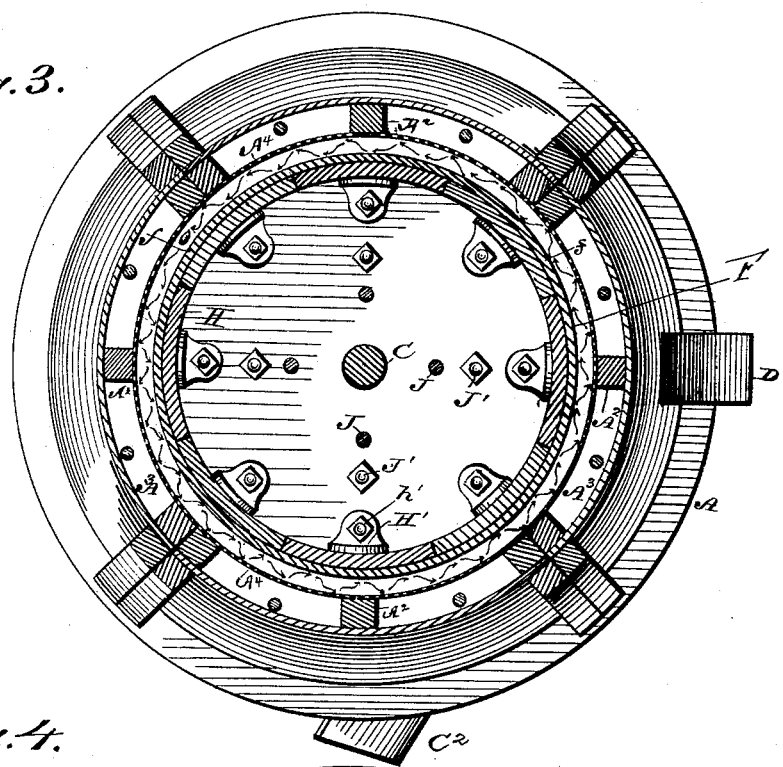
Figure 4:
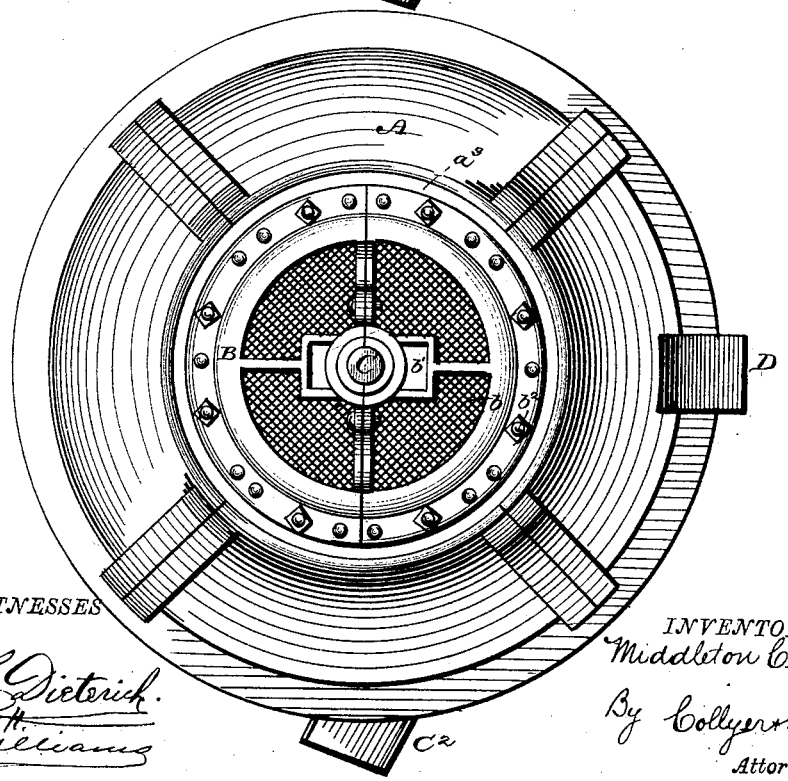

Figure 1 is a vertical elevation of the machine with a panel of the casing removed to show the construction of the cone. Fig. 2 is a vertical section of the same, showing parts, as the vertical shaft, in elevation. Fig. 3 is a horizontal section on the line $y\ y$ of Fig. 2. Fig. 4 is a top plan view. Fig. 5 is a horizontal section through the brush portion of the cone. Fig. 6 is an enlarged detail, the same being a horizontal section, and showing the relation between a grain of wheat, the concave, and the cone, the arrows indicating the course of a berry when the machine is in operation. Figs. 7, 8, and 9 are enlarged detailed sections, Fig. 7 being a view of the upper part of the cone, Fig. 9 the lower part, and Fig. 8 an intermediate part thereof.

Referring to the drawings, A designates the body of the casing or concave supported from a base, A', by legs or the like $a$. At suitable intervals along the inner surface of the body A are vertical studs $A^2$, and secured to their inner surfaces is a lining of wire-gauze, $A^4$. The casing A is made air-tight and of staves, and has preferably a removable panel, which is of the same construction. The space between the wire-gauze $A^4$ and the casing A comprises an annular dust-chamber, which is provided with a liberal annular air-inlet, $a^3$, at the top. This dust-chamber $A^3$ is coextensive with the sides of the concave, and connects at the bottom with a horizontal dust-chamber, $A^6$, formed between the bottom $A^5$ of the lining and the bottom $A^7$ of the shell. This latter bottom $A^7$ constitutes the top of a fan-chamber, $A^8$, and the chambers $A^6$ and $A^8$ are connected by a central opening, $a^6$, formed in the bottom $A^7$.

A spider or metal frame, B, is secured to the frame or skeleton made by the studs, $A^2$, &c., and carries a central hub, B', in which are located adjustable brasses $b^3$, controlled by threaded bolts $b^4$, which operate through said hub B' horizontally. The hub and brasses form a journal for a central vertical shaft, C, upon which is carried my improved cone, which is yet to be described. The spider or frame B has feed inlets $b'$ for the grain, and open-work air-inlets $b$, and is secured to the frame by bolts $b^2$. It will be noticed that the casing has a continuous dust-chamber with liberal air-inlets, and that it connects upon every side with free passages to the fan-chamber. It will also be noticed that the journal of the main shaft is a rigid part of the casing, and that the shaft will occupy a central position in the casing whatever may be the position of the casing itself.

In addition to the air-inlets, which open directly into the dust-chamber $A^3$, I provide the air-inlets $b$, adjacent to the grain-inlets. The fan C' is rigid with the shaft C, and serves to create a vacuum in the dust-chamber $A^3$, and this causes a draft throughout the entire area of the gauze lining $A^4$, as well as through the inlets $a^3$. The air which passes in at $b$ can only reach the dust-chamber by passing through the interstices in the gauze lining $A^4$, as the bottom $A^5$ of the inner shell is closed and has only an aperture, $a^5$, sufficient to receive the shaft C. At the side leading from the interior of the casing or concave, near its bottom, is a grain-chute, D, while leading from the fan-chamber in another direction is a dust-chute, $C^2$. The walls of the casing are conical and have an incline corresponding in pitch to that of the surface of the cone.

My improved cone is made in sections matched and secured together. G designates the cap of the cone, $G^2$ the bottom, and G' the intermediate horizontal plate. These parts are all circular disks, and are arranged concentric with the axis of the shaft C. The cap G has a cylindrical central boss, $g^5$, which receives the shaft C, and a set-screw, $c$, serves to secure the cap to the shaft, while the plate G' has a similar boss, $g^6$, with a set-screw, $c'$. Near the periphery of the cap G and in the under side thereof, is formed an annular wedge-shaped groove, $g$, which is concentric to the axis of motion of said cap, and which receives the correspondingly-formed upper ends, $h$, of the sections H, while a bracket, H', serves as a means for securing said sections H to the plate G' by bolts $h'$, which latter enter the plate from the lower side, and have their heads countersunk in an annular groove, $g'$, which receives the upper ends of the brush-sections I. The two plates G G' being secured together by vertical bolts J, and the several sections being properly in place, it is only necessary to introduce the brush-sections in the groove $g'$, and in the recesses $g^4$ of the blocks $g^3$, and to secure the plates G' and $G^2$ together by vertical bolts J', Fig. 9, in order to complete the cone. The blocks $g^3$ are dovetailed in the plate $G^2$, and this latter plate extends well out, so as to prevent the grain from collecting in the lower outer corners of the inner chamber.

The brush-sections I are provided with outwardly-projecting bristles $i$ in any approved manner, and between each adjacent pair of sections I arrange flat strips $i'$, which project outward nearly as far as the bristles $i$, and serve to keep the grain progressing as fast as received by the brush part of the cone, and to prevent the grain from collecting in bunches and clogging the free action of the bristles. They also support the bristles and maintain in them a uniform degree of resistance and stiffness and at a uniform distance from the gauze lining opposite. For convenience of this description I designate the entire grinding part of the cone by the letter F. Each section has its outer face provided with a concrete, $f$, having emery for a prominent constituent. Any suitable plastic material or cement which will harden or which may be vulcanized may be used. This extends inward to any desired distance. The emery coat $f$ is of a uniform thickness, and is so arranged as to make close joints when the several sections are placed together, and after being thus placed together the cone as a whole may be suitably treated with a tool or otherwise to produce a uniform, smooth, and continuous cutting-surface. The shaft C has a pulley, K, which, by a belt, or otherwise, is operated by a motor. (Not shown.) Its lower end is stepped in a journal, L, which by a lever, M, and a screw rod, N, may be adjusted up or down at will, to regulate the width of the annular space between the cone and the lining $A^4$.

The grain in suitable quantities is fed in at the top of the machine, as near as may be to the center, and falls upon the cap G, the top of the cone. The cone revolving rapidly, its motion throws the grain toward the annular cleaning-space in a uniform thin sheet. While this space may be adjusted, as suggested, I deem it important that it should be sufficient to allow the grain to be thrown end over end between the cone and the lining. As soon as a berry reaches this annular space, it falls and comes in contact with the sharp cutting and grinding surface of the cone. By its quick but even motion the first action of the cone upon the berry is to grind off a portion of the silicious fuzz. The berry is also made to partake of the motion of the cone, and is thrown outward, with an end-over-end motion, as indicated in Fig. 6, until it strikes the wire lining A⁴. Of course the berry will fall slightly; but, in practice, I find that a single berry in my machine will pass entirely around the periphery of the cone from six to nine times. The berry, however, has not been once struck with a hard sharp blow, nor does it ever attain a speed approximating that of the cone. Its only contact with the cone is a frictional grinding one. The berry after it has been in contact with the casing or lining A, which it usually strikes at the end opposite to the one presented to the cone, again falls in the direction in which the cone is moving, and its end again comes in contact therewith, only to be ground as before. Each end of the berry is completely cleaned by successive treatment in this manner. The vacuum created in the dust-chamber A³, and the resulting draft through the annular openings a³, removes the separated impurities. The berry as it strikes the lining A⁴ shakes off its adhering impurities, and the air passing through the interstices in said lining and fed through inlets b, carries such impurities to the dust-chamber as fast as they become separated. By the time the berry has passed the emery cone its fuzz and other impurities have been entirely separated and ground off, and the berry has not been subjected to a blow sufficient to break its hull; nor have two berries been ground together, nor been in sufficient contact to rupture their pods or casings. The berry is next brushed thoroughly between the bristles and the wire-gauze, and in this part of the machine, the end-over-end movement not being desired, the brushes are made to approach very closely the gauze walls of the casing. The strips i support the bristles, to insure a complete brushing, and serve to keep the grain from clogging or packing in quantities.

I attach importance to the large area of the dust-chamber, its continuity relative to the cone, its arrangement of air inlets and passages, and to the construction of the cone itself. The grain-chute D passes from the interior of the gauze lining to the exterior of the casing, while the fan-chute projects in another direction from the fan-chamber. I may also arrange a suction-conduit connecting the grain-chute D with the fan-chamber, as indicated in a prior application, Serial No. 146,669, filed October 28, 1884.

What I claim as new is—

1. The combination of a concave or casing having an annular dust-chamber and an inner lining of wire-gauze with a revolving cone having an emery surface arranged at a sufficient distance from the lining to allow the individual berries to bound from one to the other with an end-over-end movement, and having also a brushing-surface extending nearly to the lining, as set forth.

2. The combination, with a revolving cone having an upper emery surface and a lower brush-surface, of a casing having an annular dust-chamber coextensive with both emery and brushing surface, and having its inner wall formed of wire cloth, as and for the purposes set forth.

3. The combination of a revolving cone having a grinding or cutting surface, as f, with a casing of conical interior having its inner wall formed of wire-gauze and arranged at a distance from the cone, whereby the action of the cone-surface will give to the berries a downward spiral direction with an end-over-end movement, as set forth.

4. The combination, with a revolving cone having a grinding-surface above and a brushing-surface below, of a casing or concave having an annular dust-chamber extending both above and below the cone, with its wall made of open-work wire-cloth, a fan for creating a partial vacuum within said dust-chamber, air-inlets opening into the chamber direct, and air-inlets opening within the concave and connecting with the chamber through the interstices in the wire-work lining, as set forth.

5. In a grain-cleaner having a central feed and a revolving cone with grinding and brushing surfaces, as described, the combination, with such parts, of a casing or concave, A, having an annular dust-chamber formed between an outer shell and an inner wire-gauze lining, air-inlets opening directly into said chamber, air-inlets opening into the interior of the gauze lining adjacent to the feed of grain, and means, as C' A⁸, for creating a partial vacuum within the dust-chamber, as set forth.

6. The combination, with the cone, shaft C and concave A A² A⁴, of the spider B, having journal B' b³ b⁴, feed-aperture b', and air-inlets b, said spider being rigid with the concave and adapted to serve as set forth.

7. In a grain-cleaner, a cone made in sections matched and secured together, the same consisting of upper, middle, and lower plates, grinding-sections held between said upper and middle plates, and brush-sections held between said middle and lower plates, the plates being circular, and bolts J J', for securing the middle plate to each of the others, as set forth.

8. The combination, with the cap G, having groove g, of the plate G', having groove g', the sections H, having emery faces f, the bolts h', and securing-bolts J, as set forth.

9. The combination of the plates G G', sections H, and bolts h', having their heads countersunk in groove g', with brush-sections I, having their upper ends located in said groove g', the plate G², and bolts J', as and for the purposes set forth.

10. The combination of the plate G² and the grooved blocks g³, dovetailed therein, and of the intermediate plate, G', having groove g', and the cap-plate G, having groove g, with the emery-sections H h, the brush-sections I i, and the bolts J J', as and for the purposes set forth.

11. The combination of an emery and brush cone, and of a fan-chamber and fan arranged beneath said cone, with a concave or casing having a dust-chamber extending its vertical length and formed by a casing, A, and a wire-gauze lining, $A^4$, a horizontal dust-chamber arranged between the closed bottom $A^6$ of the casing and the open centered bottom $A^7$ of the shell, and connecting the fan-chamber with the dust-chamber, and means for admitting air at the top of the dust-chamber and through the area of the open-work lining, as set forth.

In testimony whereof I affix my signature in presence of two witnesses.

MIDDLETON CRAWFORD.

Witnesses:
WM. H. SLOAN,
E. F. WILLIAMS.